Patented Apr. 24, 1934

1,956,248

UNITED STATES PATENT OFFICE

1,956,248

SULPHURATED BASE

Deric William Parkes, Edgbaston, Birmingham, and Charles Donald Mitchell, West Bromwich, England No Drawing. Original application January 16, 1933, Serial No. 652,024. Divided and this application August 7, 1933, Serial No. 684,112. In Great Britain January 20, 1932

12 Claims. (Cl. 260—17)

This invention relates to a process of manufacture of new sulphurated derivatives of certain heterocyclic organic bases.

One object of the invention is to provide an improved method of manufacturing a substance suitable for use as a restrainer in the pickling of iron or steel. Another object is to provide a substance which can be employed in conjunction with acids and organic solvents for removing rust and grease from iron and steel prior to painting. Another object is to provide a substance which can be used as a restrainer which will be effective with any of the acids commonly employed for pickling iron and steel. Yet another object of the invention is to provide an improved substance capable of use as an accelerator for use in the vulcanization of rubber.

The invention comprises treating one or more nitrogenous bases with sulphur or sulphur chloride. The base to be treated is a homologue of pyridine or quinoline or, if a mixture of bases be used, such homologues of pyridine or quinoline constitute the principal components of the mixture. The mixture may however also contain other cyclic nitrogenous bases, particularly piperidine and the dipiperidyls. The bases need not be purified by any special process, and can be used in the crude commercial form. It is especially preferred to use the substances known in commerce as heavy pyridine bases, which consist essentially of the higher homologues of pyridine; they are present in all fractions obtained by the distillation of tar, but predominate in the higher boiling fractions.

Sulphuration takes place either by heating with sulphur or by treatment with sulphur monochloride. When sulphur is used, the heating may take place from temperatures of 130° C., or less when piperidine or dipiperidyl bases are present in any substantial quantity, for a period of time which depends on the composition of the mixture to be sulphurated. In the case of the heavy pyridine bases this period is 25–30 hours, but it may be substantially reduced when reduced bases such as piperidine and the dipiperidyls are present in the mixture. With a given class of base the period of heating can be reduced as more sulphur is used. The temperature of heating varies with the boiling-point of the bases under atmospheric pressure, although by increasing the pressure bases of low boiling point may be heated at higher temeperatures.

When sulphur monochloride is used as the sulphurating agent the action is much more violent than with sulphur and can conveniently be modified by the use of diluents such as benzene and paraffin hydrocarbons which do not react. The advantages of the use of sulphur chloride are that the duration of the reaction is considerably reduced, and no sulphur is lost as in the case of heating with sulphur, about half of which is evolved as hydrogen sulphide.

The reaction products are preferably dissolved in sulphuric acid, in which state they may be purified. For this purpose they may be heated to about 105° C. to 120° C. and simultaneously blown with steam.

The following is an example of the manner of manufacturing the substances which form the subject of the present invention.

A quantity of the product known in commerce as heavy pyridine bases, having a specific gravity of 0.971 at 15° C. and distilling at temperatures between 155° and 205° C. is introduced into a still fitted with a reflux condenser together with 4 pounds of dry commercial sulphur to each gallon of the heavy pyridine bases introduced. The mixture is heated until there is a gentle reflux from the condenser. The temperature of the liquid at this stage is about 135° C., hydrogen sulphide is evolved, and the heating is continued for about 20 to 25 hours, when the temperature of the liquid will have risen to about 155° C. The period of heating may be reduced and the final yield improved if the mixture be agitated during the refluxing. The product, which amounts in volume to about ¾ of a gallon to each 1 gallon of heavy pyridine bases employed, and of which the specific gravity is about 1.164, is then allowed to cool. The sulphurated bases thus prepared may be purified by mixing with an equal volume of sulphuric acid sp. gr. 1.45, care being taken to prevent undue rise of temperature. Scum and tarry matter then rise to the surface and are separated by any convenient method. However, the sulphate of the sulphurated bases still contains impurities having an offensive odour, and to remove these the liquid is heated to a temperature of from 105 to 120° C. and simultaneously blown with steam. The final product is then obtained in a sufficient degree of purity for practical purposes.

The present application is a divisional of our co-pending aplication Serial No. 652,024 filed on the 16th day of January 1933.

We claim:

1. The process which comprises sulphurating a mixture comprising at least one member of the group consisting of homologues of pyridine and quinoline.

2. In a process for the manufacture of a sulphurated body, the step which comprises heating sulphur with at least one member of the group consisting of the homologues of pyridine and quinoline.

3. In a process for the manufacture of a sulphurated body, the step which comprises heating sulphur with a mixture, the principal constituents of which are members of the group consisting of the homologues of pyridine and quinoline, and which contains in addition at least one member of the group consisting of piperidine and the dipiperidyls.

4. In a process for the manufacture of a sulphurated body, the step which comprises heating sulphur with heavy pyridine bases.

5. In a process for the manufacture of a sulphurated body, the step which comprises treating with sulphur chloride at least one member of the group consisting of the homologues of pyridine and quinoline.

6. In a process for the manufacture of a sulphurated body, the step which comprises treating with sulphur chloride a mixture the principal constituents of which are members of the group consisting of the homologues of pyridine and quinoline, and which contains in addition at least one member of the group consisting of piperidine and the dipiperidyls.

7. In a process for the manufacture of a sulphurated body, the step which comprises treating heavy pyridine bases with sulphur chloride.

8. In a process for the manufacture of a sulphurated body as claimed in claim 1, the step which comprises dissolving the crude sulphurated product in sulphuric acid.

9. In a process for the manufacture of a sulphurated body, the steps which comprise sulphurating a mixture comprising at least one member of the group consisting of homologues of pyridine and quinoline, dissolving the crude sulphurated product in sulphuric acid, and purification of the dissolved product by heating and blowing with steam.

10. A body obtained by sulphurating at least one member of the group consisting of the homologues of pyridine and quinoline.

11. A body obtained by sulphurating a mixture consisting principally of at least one member of the group consisting of the homologues of pyridine and quinoline and also at least one member of the group consisting of piperidine and the dipiperidyls.

12. Sulphurated heavy pridine bases.

DERIC W. PARKES.
C. DONALD MITCHELL.